US007813694B2

(12) United States Patent
Fishman et al.

(10) Patent No.: US 7,813,694 B2
(45) Date of Patent: *Oct. 12, 2010

(54) PROVIDING MULTI-TIERED BROADCASTING SERVICES

(75) Inventors: David A Fishman, Lakewood, NJ (US); Raymond K Jones, Voorhees, NJ (US); Eric Zhong, East Brunswick, NJ (US)

(73) Assignee: Agere Systems Inc., Allentown, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/038,519

(22) Filed: Feb. 27, 2008

(65) Prior Publication Data

US 2008/0163291 A1 Jul. 3, 2008

Related U.S. Application Data

(63) Continuation of application No. 10/717,728, filed on Nov. 20, 2003, now Pat. No. 7,363,000.

(60) Provisional application No. 60/433,300, filed on Dec. 13, 2002.

(51) Int. Cl.
*H04H 20/71* (2008.01)
*H04H 40/00* (2008.01)
*H04B 7/185* (2006.01)

(52) U.S. Cl. ..................... 455/3.01; 455/12.1; 455/3.06

(58) Field of Classification Search ................ 455/3.01, 455/3.02, 3.03, 3.04, 3.05, 3.06, 344, 66.1
See application file for complete search history.

(56) References Cited

U.S. PATENT DOCUMENTS 5,063,610 A * 11/1991 Alwadish ..................... 455/45
5,161,251 A * 11/1992 Mankovitz ................. 455/66.1
5,404,566 A * 4/1995 Wehrmeyer ................ 455/3.06
5,408,686 A * 4/1995 Mankovitz ................. 455/66.1
5,491,838 A * 2/1996 Takahisa et al. ............ 455/3.06
5,526,284 A * 6/1996 Mankovitz ................. 455/66.1
6,067,008 A * 5/2000 Smith ......................... 340/438
6,282,713 B1 * 8/2001 Kitsukawa et al. ............ 725/36
6,507,727 B1 * 1/2003 Henrick ..................... 455/3.06
6,577,849 B1 * 6/2003 Eaton et al. ................ 455/3.01
6,598,228 B2 * 7/2003 Hejna, Jr. ..................... 725/91
6,622,007 B2 * 9/2003 Linden ...................... 455/12.1
6,915,107 B1 * 7/2005 Lusk ......................... 455/3.06
6,988,277 B2 * 1/2006 Kovac et al. .................. 725/34
7,120,921 B1 * 10/2006 Ito .............................. 725/32
7,149,469 B2 * 12/2006 Russell ...................... 455/3.01
7,164,882 B2 * 1/2007 Poltorak .................... 455/3.06
7,343,141 B2 * 3/2008 Ellis et al. ................... 455/132

(Continued)

*Primary Examiner*—Tilahun Gesesse
(74) *Attorney, Agent, or Firm*—Mendelsohn, Drucker & Associates, P.C.; David L. Cargille; Steve Mendelsohn

(57) ABSTRACT

A secondary satellite radio or broadcast channel is used to broadcast advertisement clips (e.g., audio clips) to a receiver for subsequent decoding and playback. The receiver is configured for different tiers of service, e.g., one that delivers substantially advertising-free content and another that delivers content that includes more significant amounts of advertising. The content delivered to both is the same content; however, for the service tier that includes more advertising, the advertisements broadcast on the secondary channel are interleaved into the content, preferably in such a way that the continuity of the content being delivered is not compromised.

43 Claims, 5 Drawing Sheets

U.S. PATENT DOCUMENTS

2001/0033442 A1* 10/2001 Rines et al. .................... 360/1
2002/0183059 A1* 12/2002 Noreen et al. ............... 455/427
2004/0025174 A1* 2/2004 Cerrato .......................... 725/9
2005/0059341 A1* 3/2005 Damaghi ................... 455/3.06
2005/0266796 A1* 12/2005 Steelberg et al. ........... 455/3.06

* cited by examiner (Typical)

PROVIDING MULTI-TIERED BROADCASTING SERVICES

CROSS-REFERENCE TO RELATED APPLICATIONS

This application is a continuation of and claims priority to U.S. application Ser. No. 10/717,728 filed Nov. 20, 2003, which is based on and claims priority to U.S. Provisional Application No. 60/433,300, filed Dec. 13, 2002, both of which are incorporated fully herein by reference.

FIELD OF THE INVENTION

This invention relates to wireless transmissions and, more particularly, to a method and system for providing commercial-free and commercial satellite radio broadcasts simultaneously.

BACKGROUND OF THE INVENTION

Satellite radio is an emerging technology that is in the early stages of gaining consumer acceptance. Major electronics manufacturers such as Pioneer, Alpine, Clarion, Delphi, Sony, and Kenwood and automobile companies, such as General Motors and Ford, are partnering with satellite radio providers to bring satellite radio to the consumer. Satellite radio enables users to subscribe to a service by which high quality audio channels, free of the interference often accompanying traditional radio frequency (RF) broadcast systems, is available via satellite transmission. In addition, in vehicular use, satellite radio enables a vehicle equipped with the appropriate receiving equipment to hear the same channel regardless of the vehicle location, i.e., a vehicle could travel from New York to Los Angeles without losing the signal of a particular channel to which the receiving equipment is tuned.

Typically a satellite radio service provider utilizes at least two satellites, although a single satellite or more than two satellites may be used, depending upon the amount of coverage area desired. Additionally, the satellite radio provider may utilize terrestrial repeaters to improve broadcast coverage in areas of satellite signal blockage. The service provider selects content for each of the channels it broadcasts and combines them into one or more signals for transmission to the satellites and terrestrial repeaters, which retransmit the signals where they can be received by radio receivers possessed by subscribers. The signal can contain hundreds of channels, the actual number depending on the particular system bandwidth and channel compression and encoding parameters. The radio receivers are programmed to receive the signals and unscramble them so that the listener who has tuned to a particular channel can enjoy the content. Other information can be included in the broadcast signal. For example, information regarding the artist and title of a particular song being played can also be provided within the digital stream on the channel the user has tuned to, or through a shared service channel.

There are essentially two companies providing digital audio signals via satellite radio. XM Satellite Radio, based in Washington, D.C., transmits multiple channels of music, news, talk, sports, and children's programming. Sirius Satellite Radio, based in New York City, transmits a similar line-up of programming, but with fewer commercial channels than XM. Both companies have a business model that assumes a subscriber's willingness to pay for mostly commercial-free, high-quality, high availability services. However, it is believed that there is a segment of the population that find the commercial-free subscriber fee to be too high and would be willing to live with satellite service containing significantly more advertisements for a less expensive subscriber fee. It is likely that a service provider would welcome obtaining this market segment as long as it did not cut into the profits obtained from the commercial-free subscribers. Accordingly, it would be desirable to have a system and method for introducing advertisements in a satellite radio system that can be selectively enabled at the receiver, depending upon the particular tier of service to which the subscriber is subscribed.

SUMMARY OF THE INVENTION

A secondary channel is used to broadcast advertisement clips (e.g., audio clips) to a receiver for subsequent decoding and playback. The receiver is configured for different tiers of service, e.g., one that delivers substantially advertising-free content and another that delivers content that includes more significant amounts of advertising. The content delivered to both is the same content; however, for the service tier that includes more advertising, the advertisements broadcast on the secondary channel are interleaved into the content, preferably in such a way that the continuity of the content being delivered is not compromised

DETAILED DESCRIPTION

Figure 1:
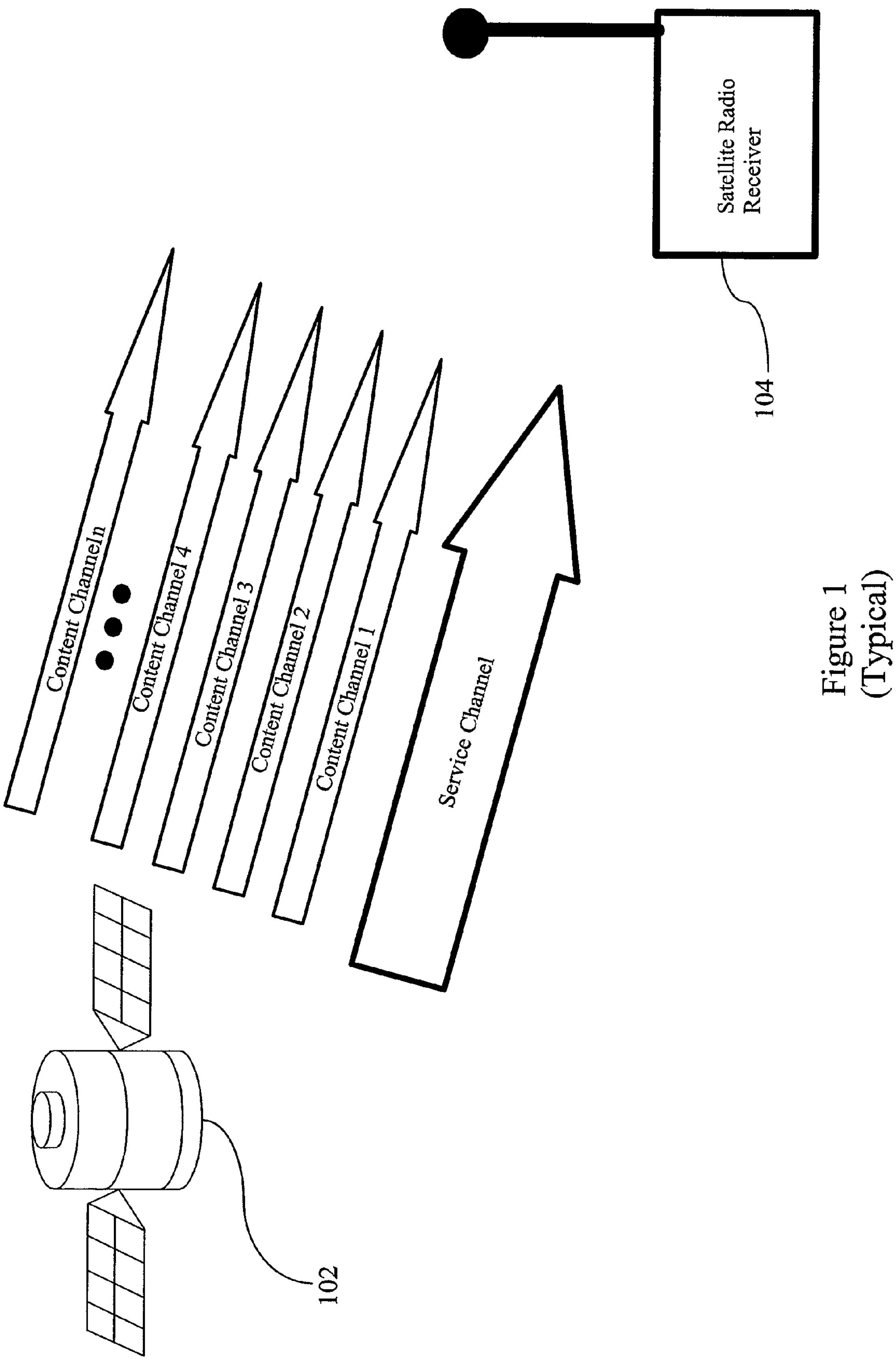
FIG. 1 illustrates in basic form the transmission of content in a satellite radio system.

FIG. 1 illustrates in basic form the transmission of content in a satellite radio system. A satellite system embodiment is described for the purpose of simplicity of explanation and it is understood that by describing such an embodiment the present invention is not limited to the described embodiment. Referring to FIG. 1, a satellite 102 transmits content (e.g., scheduled programming) over a series of channels to a satellite radio receiver 104. In a typical system, there will be multiple content channels 1, 2, 3, 4 . . . N along with a service channel. The content channels provide the content delivered to the user of the satellite radio receiver 104, such as music, sports, news, or any other content delivered to a radio listener.

The service channel provides various functionality to the satellite radio receiver. For example, it can be used to deliver information that is common to all channels, provide a channel "index" to assist the tuning process, carry content decryption keys and subscriber access control information, and provide additional low bit-rate data bandwidth.

Figure 2:
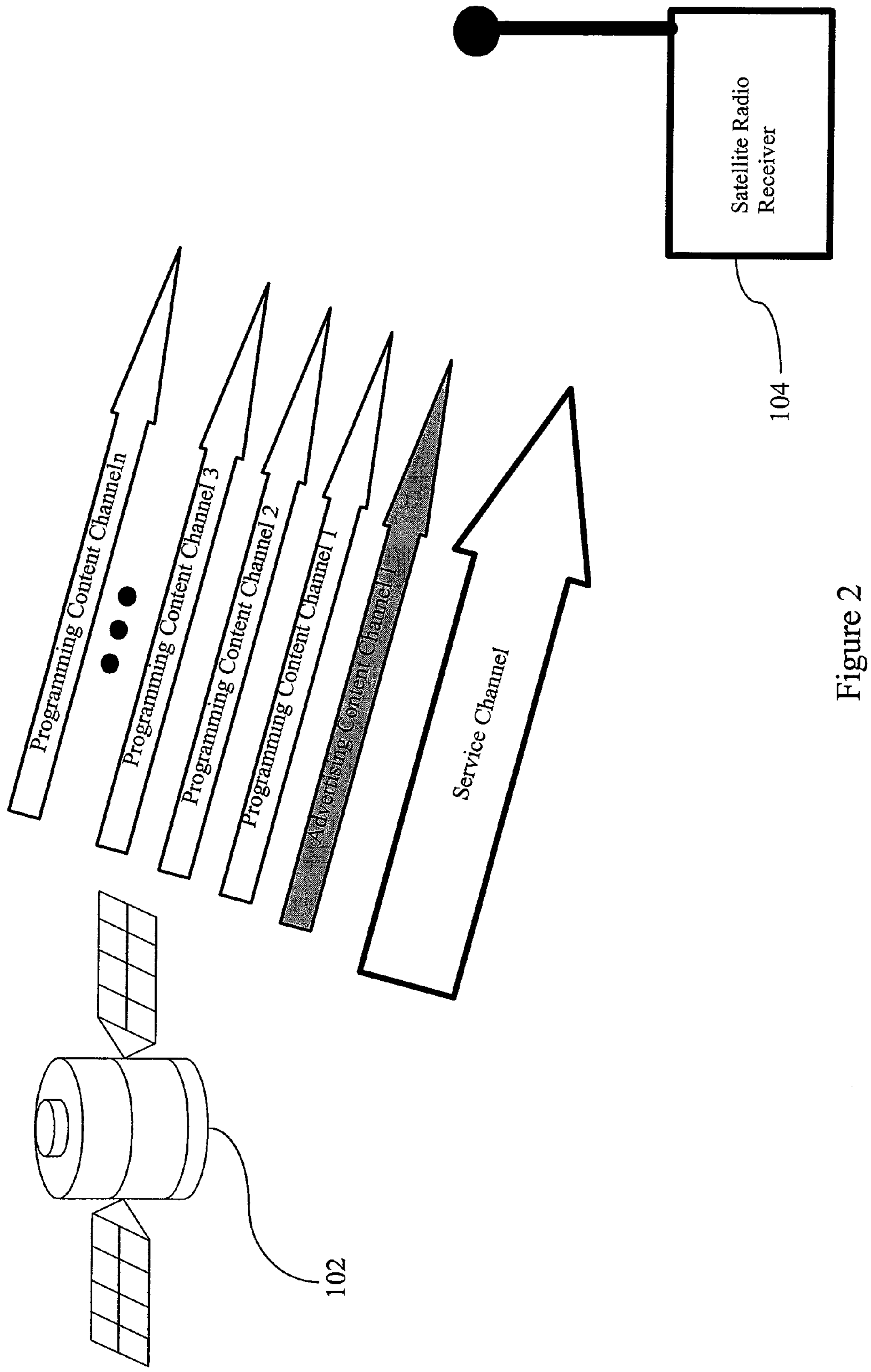
FIG. 2 illustrates a first embodiment of the present invention.

FIG. 2 illustrates a first embodiment of the present invention. The system illustrated in FIG. 2 is similar to the prior art system illustrated in FIG. 1. However, in the embodiment disclosed in FIG. 2, primary and secondary content channels are shown. The first content channel (indicated by shading) is a secondary content channel (i.e., non-programming related channel carrying promotional content such as commercial advertising content). In the example of FIG. 2, the secondary content channel comprises an advertising content channel dedicated to delivering advertising content from the satellite to the satellite radio receiver. The remainder of the content channels are primary content channels, in this example, programming content channels. The satellite radio receiver 104 is configurable to operate for at least two tiers of service. In the first tier of service (called "Tier 1" service), the radio is configured to receive all primary content channels but exclude reception of the secondary (advertising) content channel (or is configured so that it does not ever play the advertising content of the advertising channel). The satellite receiver 104 is also configurable for a second tier of service (called "Tier 2" service), whereby at predetermined intervals or predetermined times (e.g., upon turning on the radio, making channel changes, at the conclusion of the currently playing audio, etc. or any desired triggering event), the satellite radio receiver 104 is tuned to the advertising content channel 1 to play the advertising content thereon. For example, after turning on a Tier 2 subscribed radio, the listener can be required to hear a threshold value of advertising content, e.g., three complete advertisements being transmitted on (or which have been delivered over) the advertising content channel, before being allowed to tune to any other channel.

The configuration of satellite radio receiver 104 can be accomplished in several ways. If desired, the receiver can be pre-configured for Tier 1 or Tier 2 service, i.e., a Tier 2 subscriber will be given a different satellite radio receiver 104 than a Tier 1 subscriber with the Tier 2 receiver being configured to include the ability to receive and play the advertising content. Another method, however, is to configure the satellite radio receiver via the service channel. In this embodiment, encrypted access control messages include an additional data field to configure each satellite radio receiver 104 based upon the tier of service subscribed to by the user. This method allows receivers to be upgraded or downgraded to different subscription tiers after they are distributed to subscribers. Methods for providing a secure access control channel are well known.

The above-described system allows users to continue to receive, for example, substantially advertising-free satellite radio, while also giving the satellite radio provider the ability to provide service with substantial advertising, presumably at a lower subscription price to the user. This increases subscribership for the service provider and reduces costs, if desired, to subscribers of the service.

Figure 3:
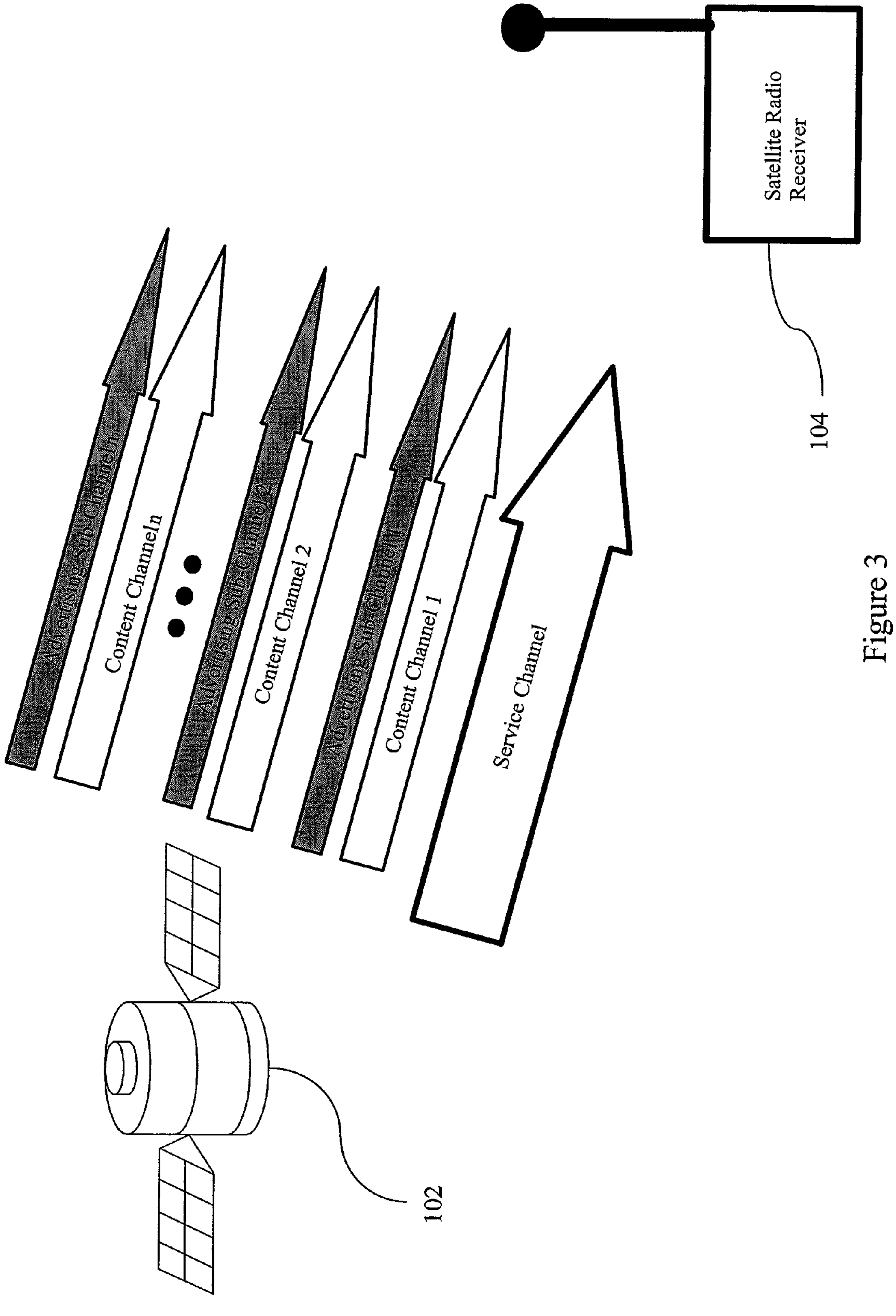
FIG. 3 illustrates an alternative embodiment of the present invention.

FIG. 3 illustrates an alternative embodiment of the present invention. Instead of having a single advertising content channel to handle all advertising for all channels being provided by the service provider, in FIG. 3, each programming content channel has an advertising content sub-channel associated therewith. Thus, combined with programming content channel 1 is a low bit-rate advertising content sub-channel 1 that provides advertising for programming content channel 1; likewise advertising content sub-channel 2 provides advertising for programming content channel 2, etc. Because it is not decoded in real-time, the sub-channel bit rate can be extremely low, on the order of several hundred bits per second (bps), and utilize bit-robbing techniques that can be masked by the error concealment algorithms associated with the high quality content channel audio decoder. In this way, the sub-channel data will not degrade receivers already distributed to subscribers. After the receiver extracts the sub-channel from within the content channel, it can store the advertisement in available on-chip or off-chip memory for subsequent real-time decoding according to a schedule determined by the service provider. The audio coder for the sub-channel audio can be of lower quality than what is required for a "CD" quality audio content channel. For example, a 30 second advertisement, encoded at a 2.4 kbps rate, can be transmitted completely within two minutes at a 600 bps rate, and require a memory footprint of only 72 kilobits, or 9 kilobytes.

It is understood that the coding rate can be much higher, without increasing the transmission rate, and only require a larger memory footprint and longer transmission time. Further, the sub-channel data extraction is independent of the audio on the programming content channel, so it can bridge over pauses between songs, for example. To further reduce the aggregate impact on overall system bandwidth, the service provider can transmit the advertisements at predetermined time periods or intervals (e.g., in round-robin fashion), so that at any one time only a few sub-channels are actually consuming bandwidth.

A major advantage of the FIG. 3 embodiment over the FIG. 2 embodiment is the ease with which it allows each advertising content channel to be tailored to the broadcasts being delivered on its associated programming content channel. Advertisers can, for example, be charged more for advertising spots that deliver their message to a particular target demographic.

In addition, because the advertisement is stored in local memory, it is easier to overlay advertising onto the programming content being provided. This is similar in nature to the manner in which a national syndicated broadcast will cut to local broadcasting for a predetermined period of time (e.g., ten seconds for station identification, three minutes for local news, etc.). The configuration of the satellite receiver 104 for receipt of advertising content or non-advertising content is the same as disclosed with respect to FIG. 2.

Figure 4:
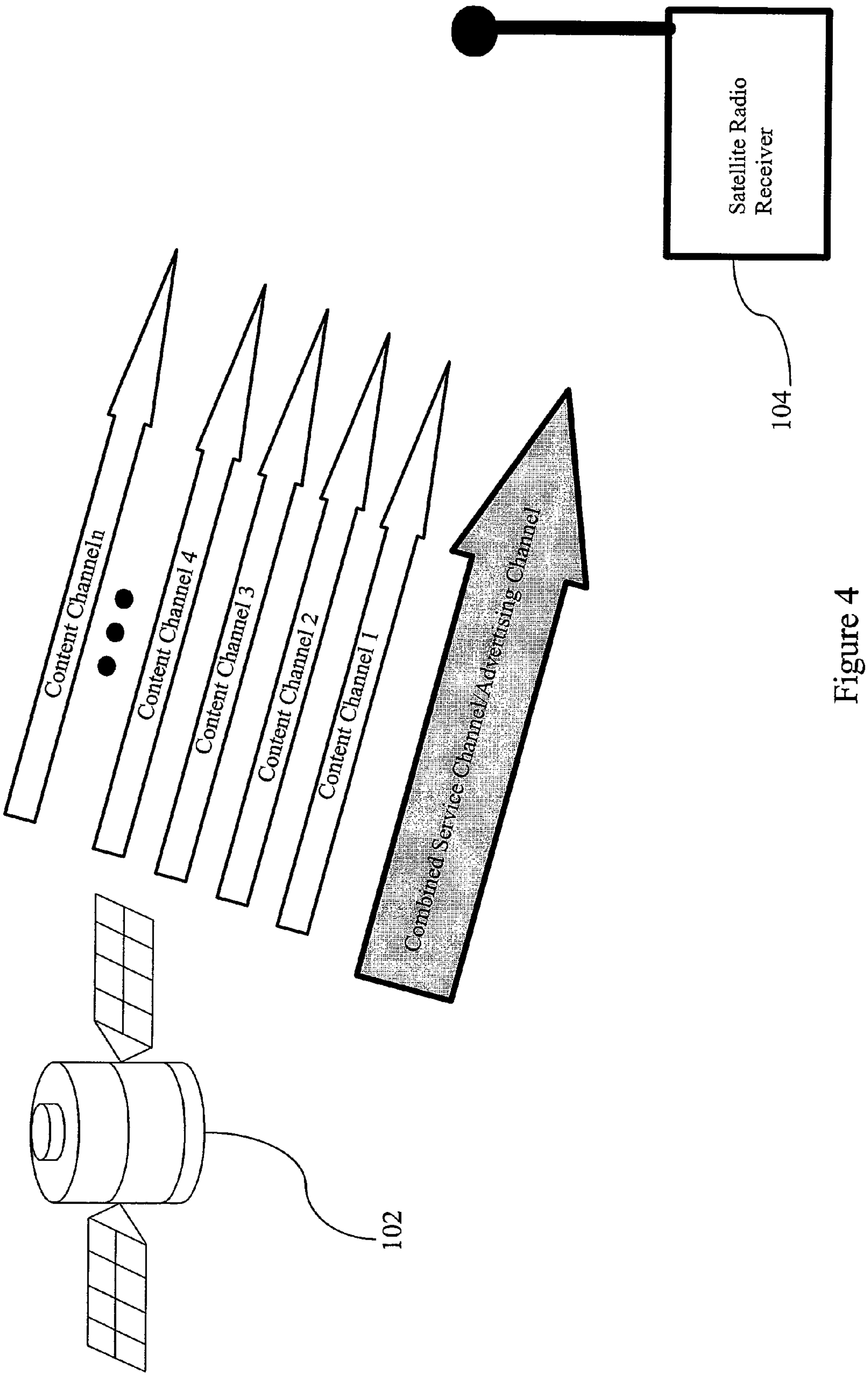
FIG. 4 illustrates another embodiment of the present invention.

FIG. 4 illustrates another embodiment of the present invention. In this embodiment, the service channel is utilized to deliver the advertising content to the satellite radio receiver. i.e., it is a combined service channel/advertising channel. Typically the normal service channel is not carrying the large volume of information that the programming content channels are carrying, and thus, there are times during the broadcast day when the service channel may be experiencing low volumes of use. In accordance with the present invention, advertising (or other secondary content) can be "downloaded" over the service channel to the satellite radio receiver during these intervals of minimized use and replayed by the satellite receiver 104 at appropriate times. Similar to the FIG. 3 embodiment that uses an advertisement content sub-channel, the advertising being carried on the service channel/advertising channel does not have to be decoded in real-time, thereby allowing a very low rate transmission. As in the FIG. 3 embodiment, the FIG. 4 embodiment is preferably configured so that the satellite radio receiver 104 includes memory for storage of the downloaded advertising materials. Further, the satellite receiver 104 is preferably configured to deliver the stored advertising content at appropriate times. The programming needed to facilitate this functionality is well within the skill of an ordinary programmer and the details of this programming are not discussed herein.

Each embodiment has certain advantages. For example, by sending the advertising content on alternate channels in real-time, the configuration on the receiving end is simple, in that there is no need to provide software programming to facilitate the delivery of the stored advertising content at the desired times. However, by delivering the advertising content in real-time, real-time bandwidth is required, potentially taking away from the delivery of programming content for other reasons. By compressing audio advertisements and streaming them through the programming content sub-channel or service channel at a low data rate for collection by a processor on the satellite receiver 104, periods of slow usage can be used to deliver the ads to the receiver and thereby minimize the use of valuable programming content bandwidth for the advertising. In addition, the second and third embodiments make it easier to splice in advertisements to start at the conclusion of, for example, a currently playing song. Pre-stored filler ads may be used to make up any difference as is presently done on commercial radio.

For the FIG. 2 embodiment, where ads are not synchronized to every channel, other advertisement delivery rules can be implemented, such as playing of advertisements immediately upon power-up and other methods mentioned earlier.

EXAMPLE

The following illustrates an example of a multi-tier service in accordance with the present invention.

Subscriber A (sub-A) is a premium, $9.99 per month, commercial-free subscriber, while subscriber B (sub-B) pays much less for the service that includes commercial advertising, e.g., $4.99 per month. The two tiers of service are offered by provider P. In this example, sub-A and sub-B are tuned to the same audio channel, for example, the "70's" music channel. Sub-A receives non-stop 70's music without commercial interruption. The receiver plays every song in the 70's lineup that provider P is delivering at that time. Sub-B will have access to the same high quality 70's sound as Sub-A, but the receiver software, following either preprogrammed or broadcast instructions, will insert advertising overlays into the broadcast lineup. The result is that Sub-B will not hear every song that provider P broadcasts. Alternatively, the advertisements can be played following the receiver power-up or each time the channel is re-tuned, thus maintaining the full level of service, after the advertisements are played. The number of advertisements that play on a given receiver, and their frequency and location (between songs at fixed intervals or between channel changes), are all variables that can provide for multiple tiers of service.

Figure 5:
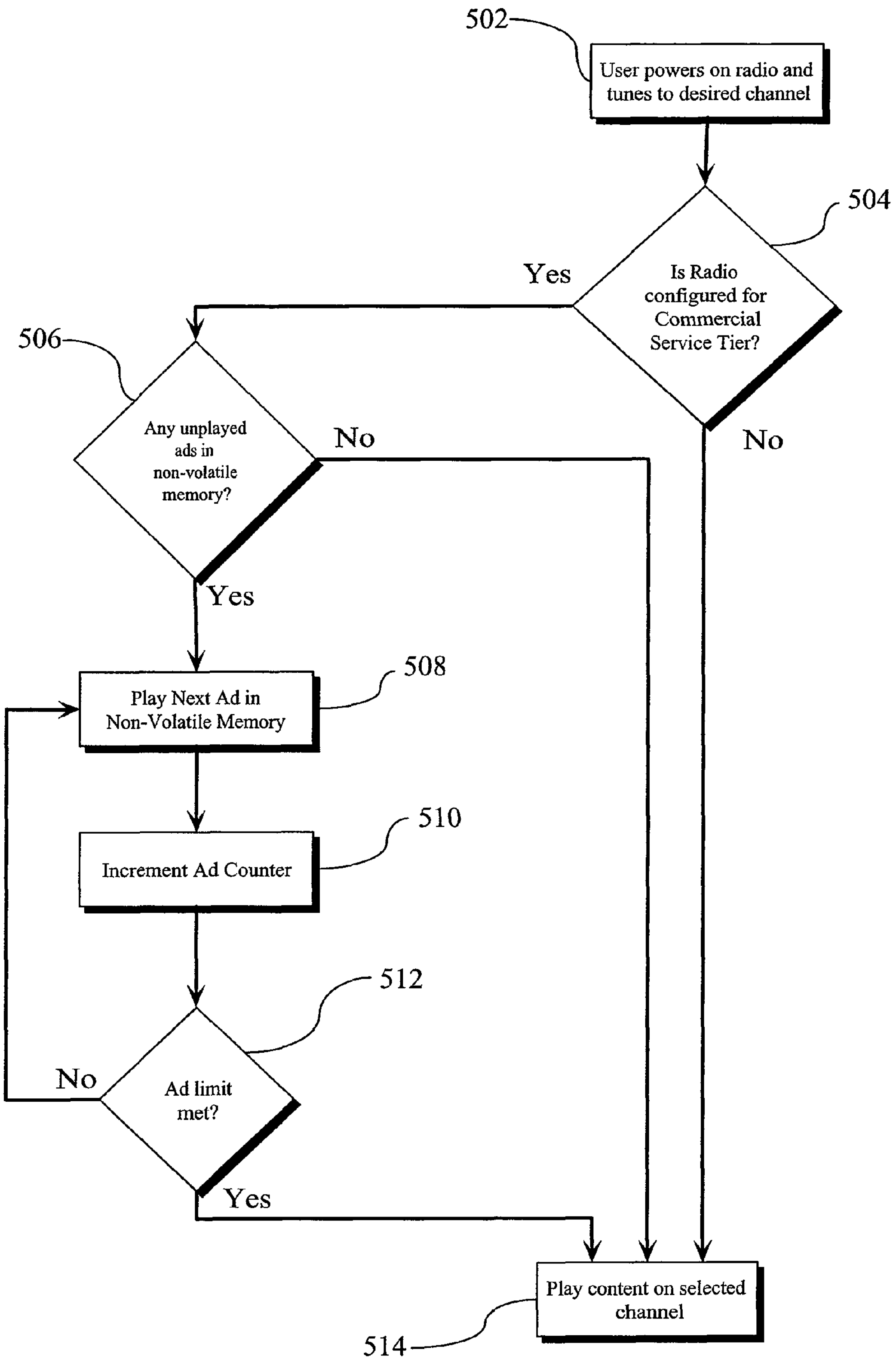
FIG. 5 is a flowchart illustrating an example of processing steps performed in accordance with the present invention.

FIG. 5 is a flowchart illustrating an example of processing steps performed in accordance with the present invention. At step 502 a user powers on the radio and tunes to the desired channel. At step 504, a determination is made as to whether or not the radio is configured for a commercial service tier. This determination can be made, for example, by checking a "service tier bit" in non-volatile encrypted memory to determine which service tier the receiver is subscribed to. If, at step 504, it is determined that the radio is not configured for a commercial service tier (i.e., that it is configured for commercial-free service), the process proceeds directly to step 514 and the content is played on the selected channel.

If, however, it is determined at step 504 that the radio is configured for the commercial service tier, then the process proceeds to step 506, where a check is made to determine if there are any un-played ads in non-volatile memory. If there are no un-played ads in non-volatile memory, this means that the user is not supposed to receive any ads at this time and the process proceeds to step 514 where content is played on the selected channel. If, however, at step 506, it is determined that there are un-played advertisements in the non-volatile memory, then at step 508, the next advertisement in the non-volatile memory is played, and then the process proceeds to step 510, where an ad counter is incremented to indicate that an additional advertisement has been played. The purpose of incrementing the ad counter is to keep track of how many ads have been played so that a limit on how many ads are played at one time by a receiver can be maintained. The number of advertisements to be played before the process for the user is given access to the content can be set by default or set by other known means.

At step 512, a determination is made as to whether or not the advertising limit has been met. If yes, then the process proceeds to step 514 where the content is played by the user. If the ad limit has not yet been met, then the process proceeds back to step 508 where the next ad stored in non-volatile memory is played back.

If the channel that was tuned to has a commercial sub-band, the audio decoder algorithm will detect and extract advertisement control headers and audio data in the sub-channel that are intermingled with content channel audio frames. The content channel audio is decoded in real-time, while the sub-channel data is gathered into blocks and stored in temporary memory until an entire advertisement is completed. Once the ad is complete, it will be stored in non-volatile storage with an index number that is transmitted with the ad in the sub-channel. The playback counter is initialized at this time, and flags are also set to indicate that a new advertisement has arrived. The process described in this step is repeated for each new ad that is received on the current channel. If the channel is changed prior to receipt of a complete ad, the temporary memory is cleared, and the ad extraction process starts again. The number of ads that are stored in non-volatile memory is a variable depending on the memory availability and/or instructions received by the receiver over the service channel.

If the (commercial) user changes a channel, the software will check memory for any un-played ads, and play at least one before tuning on to a new channel.

If the user stays on one channel for an extended period, then the software will play one or more ads after an ad interval timer expires and the then current content audio, e.g. song, completes.

The above-described steps can be implemented using standard well-known programming techniques. The novelty of the above-described embodiment lies not in the specific programming techniques but in the use of the steps described to achieve the described results. Software programming code which embodies the present invention is typically stored in permanent storage of some type, such as permanent storage of a satellite radio receiver. In a client/server environment, such software programming code may be stored with storage associated with a server. The software programming code may be embodied on any of a variety of known media for use with a data processing system, such as a diskette, or hard drive, or CD-ROM, or non-volatile memory. The code may be distributed on such media, or may be distributed to users from the memory or storage of one computer system over a network of some type to the receiver in an over-the-air download. The techniques and methods for embodying software program code on physical media and/or distributing software code via networks are well known and will not be further discussed herein.

It will be understood that each element of the illustrations, and combinations of elements in the illustrations, can be implemented by general and/or special purpose hardware-based systems that perform the specified functions or steps, or by combinations of general and/or special-purpose hardware and computer instructions.

These program instructions may be provided to a processor to produce a machine, such that the instructions that execute on the processor create means for implementing the functions specified in the illustrations. The computer program instructions may be executed by a processor to cause a series of operational steps to be performed by the processor to produce a computer-implemented process such that the instructions that execute on the processor provide steps for implementing the functions specified in the illustrations. Accordingly, the Figures herein support combinations of means for performing the specified functions, combinations of steps for performing the specified functions, and program instruction means for performing the specified functions.

While the examples described above focus on a satellite radio service provider and customer, the disclosed invention has application to any broadcast service provider that desires to simultaneously service commercial and commercial-free subscribers. For example, High Definition (HD) Radio, also known as the digital terrestrial radio system, is broadcast on commercial AM and FM frequencies. It is conceivable that the HD Radio service providers may want to emulate the success of commercial free satellite radio and thus could utilize the described invention to implement two or more tiers of service to allow servicing of both commercial and commercial-free subscribers. The methods, systems, and products described here can be utilized to provide multi-tiered service, regardless of the medium the service provider uses to reaches their customers.

Further, while the embodiments have been described in the context of delivering audio commercials within a commercial-free business model, these embodiments can be used for the delivery of any content type, for example, to deliver advertisement text to a visual display connected to the receiver.

In the examples herein, it is assumed that the receiver is either subscribed to a service tier with commercials or to a commercial-free service tier. However, multiple service tier options can be made available and still fall within the scope of the present invention The deletion of ads from memory after playout, the setting of the ad interval timer and the playout counter are parameters that can be set by encrypted commands over the service channel, or provided within the ad header information. The service tier of a particular receiver can be modified through encrypted service channel messages. These messages can be broadcast to a group of receivers, for a global update, or to any particular receiver. The procedure below is the same whether the advertisement is an audio, image or text clip.

Although the present invention has been described with respect to a specific preferred embodiment thereof, various changes and modifications may be suggested to one skilled in the art and it is intended that the present invention encompass such changes and modifications as fall within the scope of the appended claims.

We claim:

1. A method for providing multi-tiered broadcasting services to satellite radio subscribers, comprising the steps of:

at least one satellite transmitter broadcasting primary content over at least one primary content channel;

the at least one satellite transmitter broadcasting secondary content over at least one secondary-content channel;

a plurality of first satellite radio receivers playing only said primary content to a corresponding plurality of first subscribers subscribing to a first tier broadcasting service;

a plurality of second satellite radio receivers playing both said primary content and said secondary content to a plurality of second subscribers subscribing to a second tier broadcasting service;

the at least one satellite transmitter transmitting, to said first satellite radio receivers of said first subscribers, a first access control message to configure said first satellite radio receivers to play only said primary content; and the at least one satellite transmitter transmitting, to said second satellite radio receivers of said second subscribers, a second access control message to configure said second satellite radio receivers to play both said primary content and said secondary content.

2. The method of claim 1, wherein said primary content comprises substantive programming content and said secondary content comprises promotional content.

3. The method of claim 2, wherein said promotional content comprises commercial advertising.

4. The method of claim 1, wherein each primary content channel is associated with at least one secondary-content channel.

5. The method of claim 4, wherein each primary content channel is associated with a different secondary content channel.

6. The method of claim 4, wherein each primary content channel is associated with the same secondary content channel.

7. The method of claim 6, wherein said same secondary-content channel is part of a satellite radio service channel.

8. The method of claim 1, further comprising the steps of:

said second satellite radio receivers requiring that said second subscribers play at least a portion of said secondary content before being able to play said primary content.

9. The method of claim 1, wherein at least one secondary-content channel is delivered using a satellite radio service channel.

10. The method of claim 9, wherein said service channel is used (i) to provide a channel index and (ii) to carry content decryption keys and subscriber access control information.

11. A system for providing multi-tiered satellite radio broadcasting services to subscribers, comprising:

means for broadcasting primary content over at least one primary content channel;

means for broadcasting secondary content over at least one secondary-content channel;

a plurality of first means for playing only said primary content to a plurality of first subscribers subscribing to a first tier satellite radio broadcasting service;

a plurality of second means for playing both said primary content and said secondary content to a plurality of second subscribers subscribing to a second tier satellite radio broadcasting service;

a means for transmitting, to said plurality of first means for playing, a first access control message to configure said first satellite radio receivers to play only said primary content; and a means for transmitting, to said plurality of second means for playing, a second access control message to configure said second satellite radio receivers to play both said primary content and said secondary content.

12. The system of claim 11, wherein said primary content comprises substantive programming content and said secondary content comprises promotional content.

13. The system of claim 12, wherein said promotional content comprises commercial advertising.

14. The system of claim 11, wherein each primary content channel is associated with at least one secondary-content channel.

15. The system of claim 14, wherein each primary content channel is associated with a different secondary content channel.

16. The system of claim 14, wherein each primary content channel is associated with the same secondary content channel.

17. The system of claim 16, wherein said same secondary-content channel is part of a satellite radio service channel.

18. The system of claim 11, wherein said plurality of means for playing both said primary content and said secondary content are adapted to play to the second subscribers at least a portion of said secondary content before playing said primary content.

19. The system of claim 11, wherein:

said first means for playing only said primary content comprises a first satellite radio receiver configured to play only said primary content; and said second means for playing both said primary content and said secondary content comprises a second satellite radio receiver configured to play both said primary content and said secondary content.

20. The system of claim 11, wherein said at least one secondary-content channel is delivered using a satellite radio service channel.

21. The system of claim 20, wherein said service channel is used (i) to provide a channel index and (ii) to carry content decryption keys and subscriber access control information.

22. A computer-readable storage medium having computer-readable program code embodied in the medium, wherein, when the computer-readable program code is executed by a computer, the computer implements a method for providing satellite radio multi-tiered broadcasting services to subscribers, the method comprising:

controlling the broadcasting by at least one satellite transmitter of primary content over at least one primary content channel;

controlling the broadcasting by the at least one satellite transmitter of secondary content over at least one secondary-content channel;

enabling a plurality of first satellite radio receivers to play only said primary content to a corresponding plurality of first subscribers subscribing to a first tier broadcasting service; and enabling a plurality of second satellite radio receivers to play both said primary content and said secondary content to a plurality of second subscribers subscribing to a second tier broadcasting service.

23. The computer-readable storage medium of claim 22, wherein said primary content comprises substantive programming content and said secondary content comprises promotional content.

24. The computer-readable storage medium of claim 23, wherein said promotional content comprises commercial advertising.

25. The computer-readable storage medium of claim 22, wherein each primary content channel is associated with at least one secondary-content channel.

26. The computer-readable storage medium of claim 25, wherein each primary content channel is associated with a different secondary content channel.

27. The computer-readable storage medium of claim 25, wherein each primary content channel is associated with the same secondary content channel.

28. The computer-readable storage medium of claim 27, wherein said same secondary-content channel is part of a satellite radio service channel.

29. The computer-readable storage medium of claim 22, wherein:

enabling said first satellite radio receivers to play only said primary content comprises configuring said first satellite radio receivers to play only said primary content; and enabling a plurality of second satellite radio receivers to play both said primary content and said secondary content comprises configuring said second satellite radio receivers to play both said primary content and said secondary content.

30. The computer-readable storage medium of claim 29, wherein:

configuring said first satellite radio receivers to play only said primary content comprises causing a transmitter to transmit to said first satellite radio receivers a first access control message to configure said first satellite radio receivers to play only said primary content; and configuring said second satellite radio receivers to play both said primary content and said secondary content comprises causing a transmitter to transmit, to a plurality of second satellite radio receivers of said second subscribers, a second access control message to configure said second satellite radio receivers to play both said primary content and said secondary content.

31. The computer-readable storage medium of claim 22, wherein said at least one secondary-content channel is delivered using said satellite radio service channel.

32. The computer-readable storage medium of claim 31, wherein said service channel is used (i) to provide a channel index and (ii) to carry content decryption keys and subscriber access control information.

33. A satellite radio receiver for use in a multi-tiered broadcasting service, wherein:

said satellite radio receiver is adapted to receive primary content over at least one primary content channel and secondary content over at least one secondary-content channel; and in a first configuration corresponding to a first service tier, said satellite radio receiver plays only said primary content, and, in a second configuration corresponding to a second service tier, said satellite radio receiver plays both said primary content and said secondary content;

wherein said satellite radio receiver is further adapted to:

require that at least a portion of said secondary content be played before playing said primary content, when said satellite radio receiver is configured to the second configuration;

track how much of said secondary content has been played; and discontinue the requirement that said secondary content be played, upon the occurrence of a first predetermined triggering event.

34. The satellite radio receiver of claim 33, wherein said primary content comprises substantive programming content and said secondary content comprises promotional content.

35. The satellite radio receiver of claim 34, wherein said promotional content comprises commercial advertising.

36. The satellite radio receiver of claim 33, wherein said satellite radio receiver is further adapted to receive a first access control message to configure said satellite radio receiver to play only said primary content and a second access control message to configure said satellite radio receiver to play both said primary content and said secondary content.

37. The satellite radio receiver of claim 33, wherein said satellite radio receiver comprises a non-volatile memory that stores information corresponding to a service tier of said satellite radio receiver.

38. The satellite radio receiver of claim 33, wherein said first predetermined triggering event comprises the reaching of a threshold-level of playing of said secondary content.

39. The satellite radio receiver of claim 33, further comprising the step of:

reinstating the requirement that said secondary content be played, upon the occurrence of a second predetermined triggering event.

40. The satellite radio receiver of claim 39, wherein said second predetermined triggering event comprises the reaching of a threshold-level of playing of said primary content.

41. The satellite radio receiver of claim 39, wherein said second predetermined triggering event comprises the changing from one primary content channel to another primary content channel.

42. The satellite radio receiver of claim 33, wherein at least one secondary-content channel is delivered using a satellite radio service channel.

43. The satellite radio receiver of claim 42, wherein said service channel is used (i) to provide a channel index and (ii) to carry content decryption keys and subscriber access control information.

* * * * *